United States Patent
Burroughs

(10) Patent No.: US 6,240,061 B1
(45) Date of Patent: May 29, 2001

(54) SEMI-PERMANENT ENCLOSURE FOR OPTICAL DATA STORAGE DEVICE

(75) Inventor: Trevor Alan Burroughs, London (GB)

(73) Assignee: Optidisc International Limited, Grand Cayman (KY)

( * ) Notice: Subject to any disclaimer, the term of this patent is extended or adjusted under 35 U.S.C. 154(b) by 0 days.

(21) Appl. No.: 09/517,091

(22) Filed: Mar. 1, 2000

Related U.S. Application Data

(62) Division of application No. 08/875,439, filed on Nov. 17, 1997.
(60) Provisional application No. PCT/GB95/00041, filed on Jan. 10, 1995.

(51) Int. Cl.[7] ........................................... G11B 7/24
(52) U.S. Cl. ................................................ 369/291
(58) Field of Search ..................... 369/291, 290, 369/284; 360/135; 346/135.1, 137

(56) References Cited

U.S. PATENT DOCUMENTS

| | | | |
|---|---|---|---|
| 3,961,656 | 6/1976 | Aggarwal | 369/291 |
| 4,319,252 | 3/1982 | Drexler | 346/135.1 |
| 4,327,830 | 5/1982 | Patel et al. | 206/303 |
| 4,360,733 | 11/1982 | Novak et al. | 250/361 R |
| 4,539,573 | 9/1985 | Marchant et al. | 346/137 |
| 4,556,968 | 12/1985 | Pelkey et al. | 369/287 |
| 4,590,493 | 5/1986 | Inoue et al. | 346/135.1 |
| 4,683,562 | 7/1987 | Matsui et al. | 369/284 |
| 4,736,966 | 4/1988 | Haddock et al. | 283/69 |
| 4,770,047 | 9/1988 | Arditty et al. | 73/800 |
| 4,879,710 | 11/1989 | Iijima | 369/291 |
| 4,920,359 | 4/1990 | Arai et al. | 346/137 |
| 4,983,437 | 1/1991 | Merrick | 428/42.1 |
| 5,020,048 | 5/1991 | Arai et al. | 369/291 |
| 5,299,186 | 3/1994 | Tsurushima | 206/308.1 |
| 5,458,940 | 10/1995 | Woo | 428/64.3 |
| 5,468,424 | 11/1995 | Wienckoski | 252/609 |
| 5,576,550 | 11/1996 | Koppikar | 250/459.1 |
| 5,774,448 | 6/1998 | Shtipelman et al. | 369/291 |
| 5,787,069 | 7/1998 | Lowe et al. | 369/291 |
| 5,912,875 | 6/1999 | Lowe et al. | 369/291 |

FOREIGN PATENT DOCUMENTS

| | | |
|---|---|---|
| 0 300 733 | 1/1989 | (EP) . |
| 0 375 298 | 6/1990 | (EP) . |
| 0 599 655 | 11/1993 | (EP) . |
| 0 959 076 | 5/1964 | (GB) . |
| 2 080 598 | 2/1982 | (GB) . |
| 2 217 507 | 10/1989 | (GB) . |
| 2 279 799 | 10/1995 | (GB) . |
| 4 245 039 | 9/1992 | (JP) . |
| 94/14161 | 6/1994 | (WO) . |
| 96/21928 | 7/1996 | (WO) . |

*Primary Examiner*—Brian E. Miller
(74) *Attorney, Agent, or Firm*—McDermott, Will & Emery

(57) ABSTRACT

A semi permanent enclosure for an optical data storage device has a first film dimensioned to overlie the read surface of the optical data storage device and a second film dimensioned to overlie the non-read surface of the optical data storage device. The enclosure includes a rim arrangement having an L-shaped cross-section extending around the periphery of the optical data storage device. The first film may have an optical couplant on the surface thereof destined for attachment to the optical data storage device. The optical couplant preferably has a refractive index compatible with that of the optical data storage device to minimize losses and distortion of signals. The optical couplant may also be used with the second film.

9 Claims, 4 Drawing Sheets

SEMI-PERMANENT ENCLOSURE FOR OPTICAL DATA STORAGE DEVICE

This application is a Divisional of application Ser. No. 08/875,439 filed Nov. 17, 1997, which is a 371 of International application Ser. No. PCT/GB95/00041, filed Jan. 10, 1995.

The present invention relates to optical data storage media such as compact discs and, in particular, to a semi-permanent enclosure for protecting the edges and faces of such data storage media during use. The invention also relates to a method of repairing minor surface defects and/or blemishes in optical data storage media.

Optical data storage media are becoming increasingly commonplace in everyday life. They are generally planar devices and have a substrate of clear plastics material or glass on which a surface formation of data "pits" is provided. The pitted surface is coated with a layer of diffused metal, such as aluminium, which serves to reflect incident light passing through the substrate from its opposing face. Data is generally read by a laser shone through the clear plastics material or glass, the incident light being distorted by the data pits and then reflected from the mirrored surfaces to be read by a pick-up.

For simplicity, in the text which follows, the term "disc" is used in a non-limiting sense to refer to optical data storage media of various types.

Damage to the read surface, that is to say the surface through which the laser reads the data pits, will result in distortion of the laser beam, causing errors in the reading of data. Similarly, damage to the reflective layer will result in a loss of reflectivity and loss of data, which will also lead to errors in reading of the data. A factor which is frequently overlooked is the possibility of damage to the reflective layer from the non-read side of the disc.

It is also desirable to avoid damage to the edge of the disc. If the edge becomes chipped, for example as a result of the disc being dropped, this may result in the reflective surface becoming exposed. In such circumstances, the reflective layer may tarnish and peel off. The purpose of the reflective layer is to reflect laser light back into the detector device of the playback apparatus. If the metallized layer is no longer reflective due to tarnish, or if portions thereof are missing altogether, the playback apparatus will receive no data from the damaged portion of the disc and will therefore skip. Once exposure of the reflective surface has occurred, it is difficult to stop progressive tarnishing and delamination. A disc damaged in this way rapidly becomes completely unplayable and must be replaced. Of course, in some cases, the stored data is unique and cannot be obtained from alternative sources.

From the foregoing, it is clear that any loss of laser light through dispersal is undesirable since this reduces laser intensity and may result in read errors. To combat this, manufacturers produce optical data storage media which have a degree of protection built in. The most vulnerable layers are the pitted surface, on which the readable data is stored, and the metallized layer. During manufacture, these are sandwiched between layers of glass or plastics material which form part of the completed disc assembly. The manufacturing process may also include the provision of a label which is also provided with a protective coating.

The present invention is defined as a "semi-permanent" enclosure in order to distinguish it from protective layers such as those described above which are provided as an inherent feature of the manufacturing process.

In addition to read errors resulting from surface damage to the disc as outlined above, laser distortion may arise from non-planarity or imbalance of the disc, for instance due to wobbling of the disc in a playback apparatus. Such distortion is equally likely to result in read errors.

Protective shields for optical discs are known, for example as described in U.S. Pat. No. 4,879,710. This patent discloses an optical disc protector comprising a transparent annular protective sheet provided with radially inner and outer rings of adhesive for securing the sheet to an optical disc. The adhesive rings are arranged so that they do not obscure the data portion of the disc. Such an arrangement suffers from the drawback that the film can be easily stripped at the edge of the disc due to the need for the contact adhesive bands to be very narrow so as not to overlie the data surface. Subsequent peeling of the film allows dust and other particles to become trapped under the film and to interfere with integrity of the laser signal. In severe cases, the film may be lifted sufficiently to cause interference with the mechanics of the playback apparatus.

In another protective arrangement known from U.S. Pat. No. 4,736,966, an optical data storage device such as a data card is provided with a plurality of peelable transparent protective layers. When a layer becomes too severely scratched for efficient reading of data, it is removed by peeling. This approach has a number of disadvantages. Firstly, the data is obscured at the outset by the number of layers interposed between the read surface and the pick-up. This problem is exacerbated if the optical disc is intended for recording as well as playback, since the signal to be recorded will be attenuated by the interposed protective layers. Further attenuation occurs on reading, so the playback signal may be very weak and severely distorted. Another disadvantage is that the removal of successive layers by peeling leaves a residue of adhesive which needs to be cleaned away prior to playback. The very act of cleaning may damage the next layer of protective film.

In European Patent Application No. 0 375 298 A2, a protective shield for an optical disc is described which is designed to be stripped from the disc immediately prior to the recording of data thereon by laser irradiation. The shield thus serves to protect the disc in the post-manufacture phase, during storage, transport and purchase by an end user. Such shields are formulated with anti-static properties to minimize attraction of air-borne dust particles. This ensures that the data is recorded on a "clean" disc. However, no provision is made for protecting the disc after recording.

European Patent Application No. 0 300 733 A1 describes a heat-shrinkable shield for optical discs. One of the drawbacks of this arrangement is that special equipment is required to ensure even application of heat to the shield to effect shrinkage thereof around the disc to be protected. Temperature control is also important to prevent damage to the substrate. This arrangement is therefore unsuitable for use by non-experts.

In British Patent Application No. 2 217 507 A, annular protective shields are disclosed for attachment to compact discs through the intermediary of a transparent or translucent gum. A special apparatus is also disclosed for applying the shields to compact discs. The shields are shown attached to the non-read surfaces of discs, since the applicant believes that the non-read surface is particularly vulnerable to damage by virtue of having only a relatively thin protective layer of u.v.-curable lacquer. While there are undoubtedly some grounds for this belief, the document does not address the problem of protecting the read surface of optical discs from accidental damage.

It is therefore an object of the present invention to provide means for protection against accidental damage to the opposed faces and edge surface of an optical disc. It is a further object of the present invention to provide means for protection against accidental damage to an optical disc which is capable of being fitted by a non-expert and without the need for special equipment. It is also an object of the present invention to provide means for protection against accidental damage to an optical disc which means is capable of being kept in place during use of the disc in standard playback apparatus, including apparatus; having a multiple disc magazine, and which fits into a standard disc "jewel" case for normal storage. It is yet another object of the present invention to provide means whereby the dynamic qualities of an optical disc are enhanced during use by elimination or suppression of wobbling or other imbalances. It is a still further object of the present invention to provide a method of repairing minor surface defects and blemishes in such discs.

In a first aspect, the invention is an enclosure for an optical data storage device, said enclosure comprising a first planar transparent film dimensioned to overlie the read surface of an optical data storage device and a second planar transparent film dimensioned to overlie the nQn-read surface of said optical data storage device, said first and second films being provided with rim means having an L-shaped cross-section said rim means being dimensioned to extend around the periphery of the optical data storage device, characterized in that a uniform layer of solid malleable optical couplant is provided on at least the first film, on the surface thereof to be attached to said optical data storage device in use, said optical couplant having a refractive index compatible with the refractive index of the optical data storage device.

Preferably, the rim means comprises upper and lower rim components. The lower rim component may be formed of mild steel or material of similar strength and characteristics. The thickness of the material from which the lower rim is made may range from 20 to 800 $\mu$m and its outside diameter may range from 80 to 140 mm, depending on the diameter of the disc to which it is to be applied. The lower rim component L-shaped cross-section is arranged such that the vertical arm of the "L" surrounds the edge of the disc while the horizontal arm of the "L" forms a lip on which the lower face of the disc rests. It will be generally understood that the lower surface of a disc is the data read surface since the upper surface is usually provided with a label and is non-reflective. Typical dimensions for the vertical arm range from 200 $\mu$m to 2.0 mm, whilst the horizontal arm may have a width of 200 $\mu$m to 30 mm. The selected width is chosen such that the lower rim component does not obscure any part of the data-carrying surface of the disc.

If the lower rim component is formed of metal, it is preferably factory-fitted to a clear, glossy and optically perfect film which is formed with a hole in its center. The hole has a diameter ranging from 14 mm to 60 mm and is dimensioned to accommodate the central raised spigot of a standard optical disc. The inside diameter of the film is chosen such that a film covering overlies the entire data-carrying surface of the disc. The film thickness may range from 1 $\mu$m to 600 $\mu$m and the material of the film is chosen such that it permits passage of laser light without significant distortion or attenuation.

Alternatively, the lower rim component may be an up-turned lip formed integrally with the film.

The optical couplant assists in the establishment of an optically perfect interface between the film and the data read surface of the disc.

Preferably, the refractive index of the optical couplant is chosen to be as close as possible to that of the optical data storage device to which the film is to be attached. Most preferably, the refractive index of the optical couplant differs by no more than ±10% and most conveniently by no more than ±5% from the refractive index of the surface of the optical data storage device to which it is attached in use.

Preferably, the optical couplant is a material, especially a silicone-based material, capable of undergoing creep into minor defects on the surface of the optical data storage device. This capability allows minor blemishes and surface asperities to be repaired so that playback losses are minimized and stored data is not compromised.

The optical couplant is a solid malleable material such as a transparent solid rubberized silicone or a transparent plastic laminar coating, for example polyvinyl chloride (PVC), interposed between the optical data storage device and the film. Such plastic coatings exhibit a cling effect similar to so-called "cling-films" and so cohere to the film and the surface of the optical data storage device.

In another form of the invention, the film itself may perform the dual 10 function of protective device and optical couplant without the need for separate adhesive or cohesive material/layers.

As indicated above, the optical couplant facilitates comprehensive joining between the film and the laser read surface of the optical data storage device. No air or other contaminant is admitted between the two. The optical couplant can be adhesive or cohesive in its action, and is preferably peelable to allow removal of the film should this prove necessary. A protective enclosure in accordance with the invention may need to be removed, for example, if it becomes damaged and needs to be replaced with another.

Since optical discs are often formed with a plastics substrate such as polycarbonate or acrylic resins, it is particularly advantageous to use films formed from the same material. This ensures good optical matching between the film, the optical couplant and the optical disc to which the film is attached. Cellulose triacetate has also been found suitable, even in the absence of an optical couplant.

A film is also attached to the non-read surface of the optical disc to ensure that its protection is comprehensive. This film may be a clear glossy plastics material and is preferably arranged such that indicia provided on the rion-read surface are still visible when the film is in place. The film need not be as optically perfect as the film used to protect the data read surface of the disc. The dimensions of the film for the non-read surface are most likely to be similar to those for the film used on the data read surface. Most preferably, the film attached to the non-read surface is integrally-formed with a down-turned lip on its outer periphery which constitutes the upper rim component of the rim means and which co-operates with the aforementioned lower rim component. This upper film is also provided with a central hole to accommodate the central spigot of the optical disc and may be coated with a contact adhesive on the surface thereof which is destined to make intimate contact with the non-read surface of an optical disc. The rim means may also have an adhesive coating to bond upper and lower rim components together and/or to bond it to the disc edge without causing interference to the laser read surface.

The rim means may have a reflective surface on the radially-inwardly directed portion thereof to reflect dispersed laser light back into the device and thereby minimize losses and reduce data read errors.

The provision of rim means has an additional benefit in that the mass of the rim creates an inertial effect as the disc is rotated in its record/playback apparatus. This means that the disc is less likely to wobble in the apparatus. A wobbling disc would result in laser light being reflected at non-ideal angles, causing loss or reduction of laser signal and possible errors in or failure of playback.

As indicated above, the rim means also protects the edge of the disc: If the edge becomes chipped or otherwise damaged, the shiny metal layer on the disc surface may be exposed and so become susceptible to peeling or tarnishing. Once again, this could result in loss or reduction of laser signal with its inevitable consequences for playback.

Another advantage of the rim means is that it can be configured to prevent the protective film surfaces from coming into contact with any planar surface on which the optical disc is rested.

The rim means may be provided as a pair of interengageable parts which snap together, one being applied in the direction of a first side (face) of an optical disc and the other being applied, in the opposite direction, from the other side of the device. The two rim portions are releasably engaged so that they can be separated to allow removal of films if required.

In another variation, the rim means is provided with minute channels at the edges through which trapped air can be expelled. Such channels facilitate effective application of the films to the optical disc by ensuring that there are no discontinuities at the interface between the film and the optical disc.

Conveniently, an upper rim/film assembly is factory-supplied with a transparent contact adhesive so that it can be stuck to the top label surface of an optical disc and also grips the lower rim component to hold it in place.

The rim means is dimensioned to allow use of the present invention with magazines of optical discs with automatic changing apparatus, for example multi-disc CD players. Such rims must be sufficiently robust that they are capable of withstanding the handling forces encountered in the automatic changing apparatus whilst retaining the protective films in place.

The rim components may be integrally formed with a respective film member, or may be separate therefrom. The rim means may be secured to a respective film member by welding or some other form of permanent bonding. If the rim component is metal, the reflective radially-inwardly directed surface may simply be the bright finish of the metal itself.

In a second aspect, the invention provides a method of repairing minor defects and/or blemishes on the laser read surface of an optical data storage device, the method comprising the steps of:

(a) applying a first planar transparent film over the laser read surface of said optical data storage device, said first film having a uniform layer of solid malleable optical couplant on the surface thereof adapted for attachment to said optical data storage device;

(b) squeezing any air from between said first film and the optical data storage device;

(c) allowing the optical couplant to creep into the damaged regions of the surface of said optical data storage device;

(d) applying a second planar transparent film over the non-read surface of said optical data storage device, and (e) retaining said first and second films in place with rim means having an L-shaped cross-section extending around the periphery of the optical data storage device.

The method defined above is capable of curing minor surface defects for as long as the film remains in place. The optical couplant creeps into scratches and like surface blemishes to leave a surface which is readable by incident laser without losing focus. If the film is removed, however, the damage will become apparent again once the surface is cleaned.

A more permanent optical couplant could be used which would remain in place after removal of the film and after cleaning.

The invention will now be described by way of example only with reference to the drawings, in which.

Figure 1:
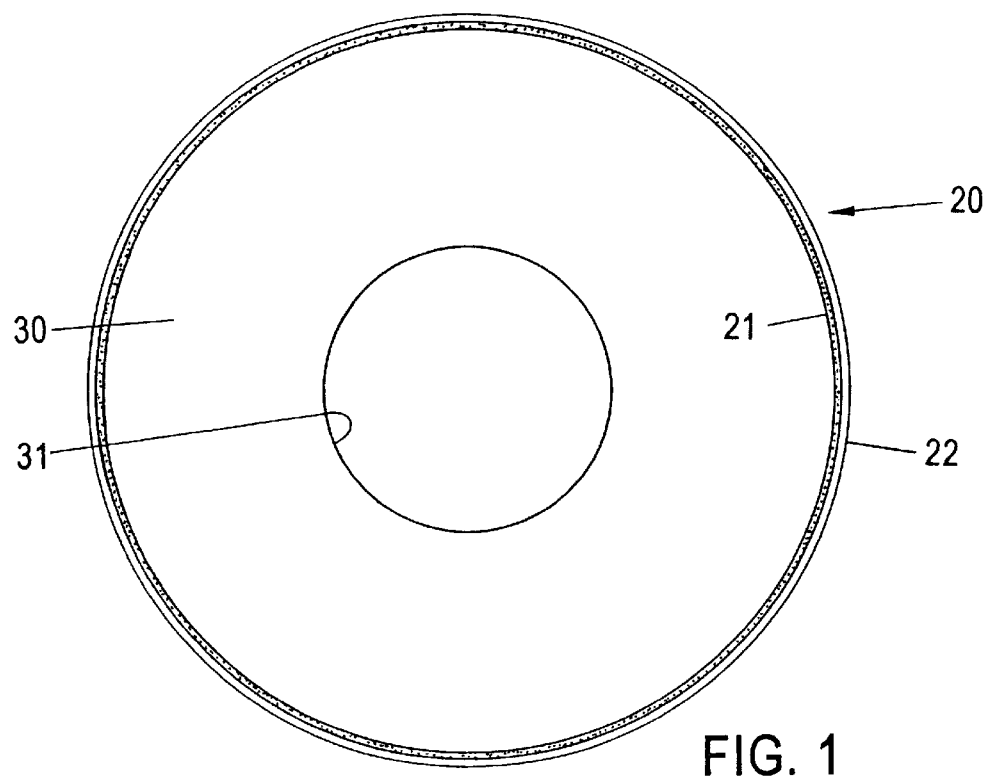
FIG. 1 is a view from below of one embodiment of the invention, showing an upper rim and a film member.
Figure 2:
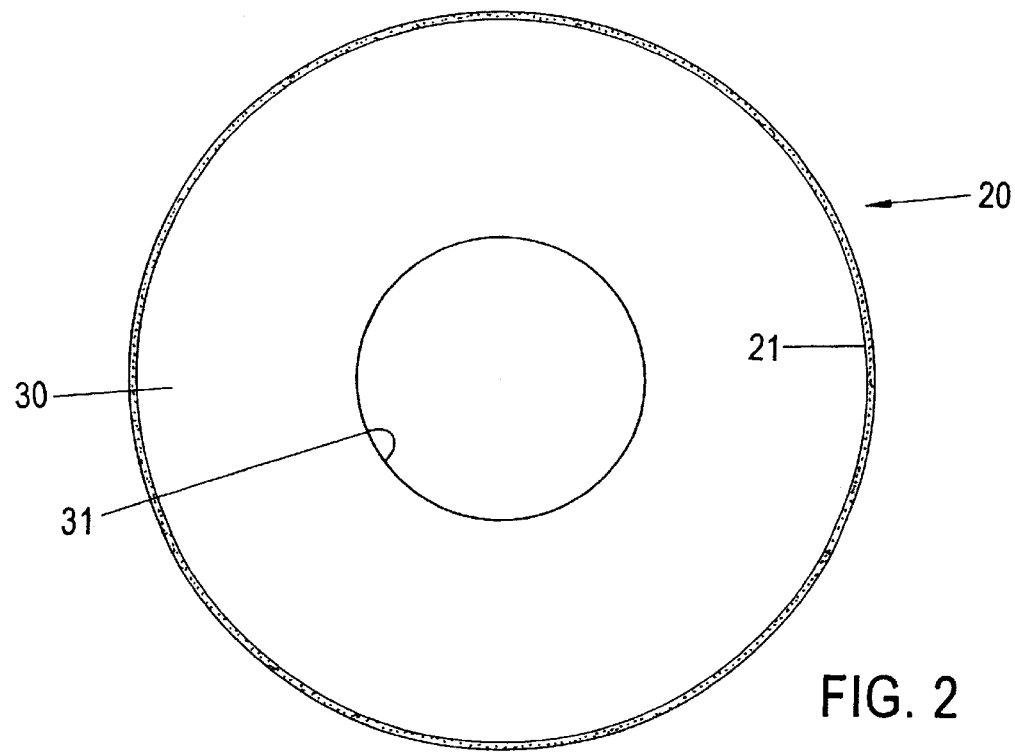
FIG. 2 is a view from above of the arrangement depicted in FIG. 1.

Referring now to FIGS. 1 and 2, these views show the bottom and top views, respectively of an upper rim 20 and film 30 for use with a laser-readable compact disc (not shown). The upper film 30 has a central cut-out 31 to accommodate a central boss of the compact disc. Typically, the diameter of the cut-out 31 is arranged to be larger than the diameter of the central boss of the compact disc because the internal rim region of such bosses is utilized in reproduction equipment to centralize and grip the disc during playback.

FIG. 1 shows a rim edge 21 which slightly overlies the outer periphery of the film 30, and a rim lip 22. The rim lip 22 should be regarded as extending outwards from the plane of the drawing and is only shown here schematically as a circle surrounding the rim edge 21.

FIG. 2 merely shows the rim edge 21 from above. In this view, the rim lip is not visible but may be regarded as projecting from beneath the plane of the drawing.

Figure 3:
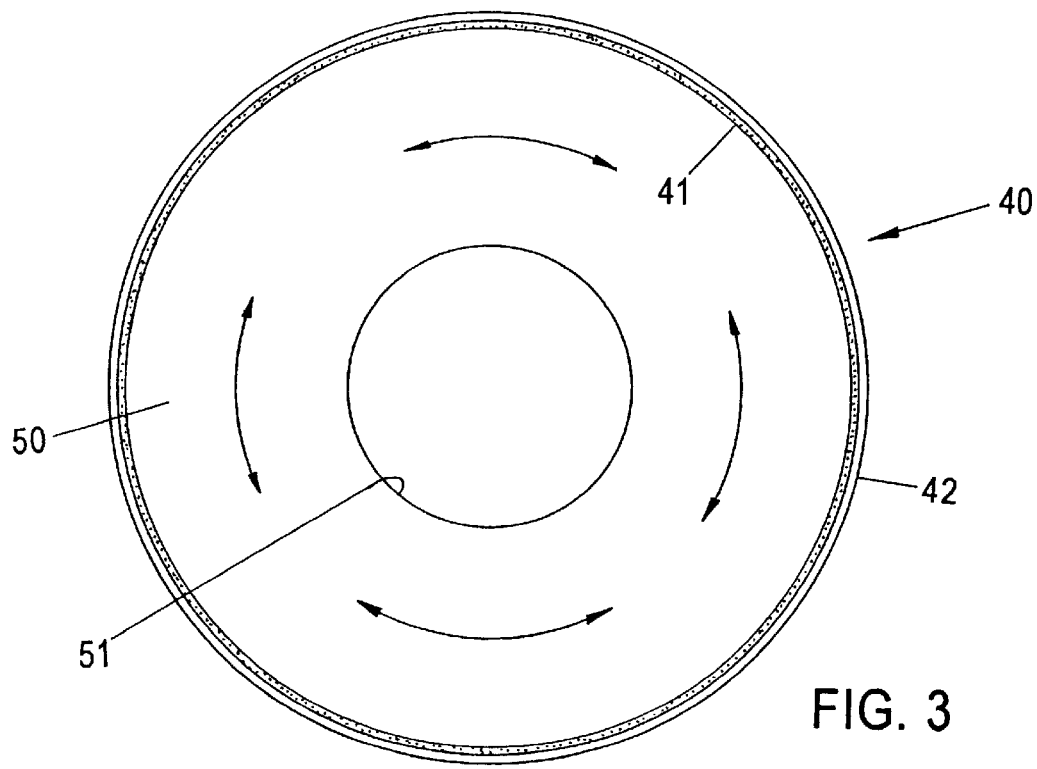
FIG. 3 is a view from above of a lower rim and film in accordance with the invention.
Figure 4:
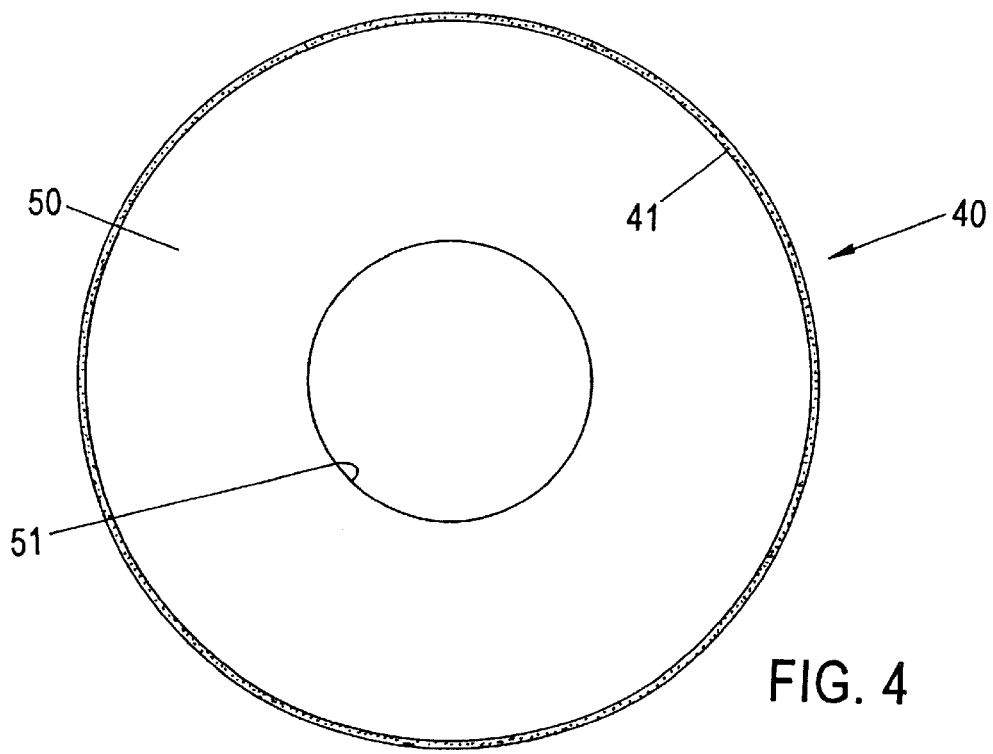
FIG. 4 is a view from below of the arrangement shown FIG. 3.

FIGS. 3 and 4 are similar views to FIGS. 1 and 2, except that they show top and bottom views, respectively of a lower rim 40 and film 50 for use with the laser-readable compact disc. Like its upper counterpart, the lower film 50 has a central cut-out 51 to accommodate the central boss of the compact disc. For the reasons given above, the diameter of cut-out 51 is larger than the diameter of central boss of the compact disc.

In FIG. 3, a rim edge 41 is shown slightly overlying the outer periphery of the film 50. Rim 40 has a rim lip 42 shown here schematically as a circle surrounding the rim edge 41. This lip 42 should be regarded as extending outwards from the plane of the drawing. In FIG. 4, rim lip 42 is not visible.

Figure 5:
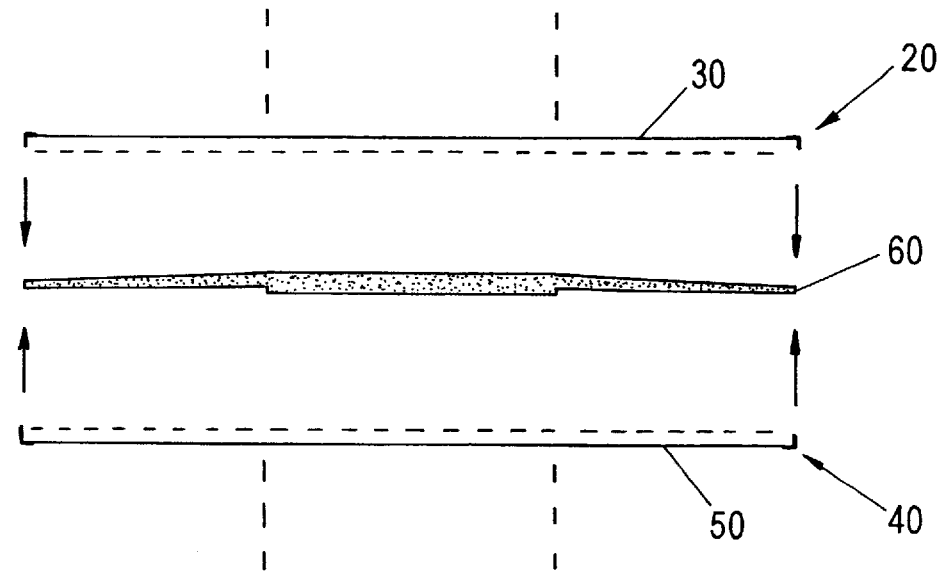
FIG. 5 is an exploded side view of upper and lower rims and films prior to their attachment to an optical storage device.

FIG. 5 is an exploded view of the upper 20 and lower 40 rims and their respective film members 30 and 50, prior to attachment to a compact disc 60.

In practice, one of the upper or lower assemblies would be selected for attachment to a first surface of the compact disc

Figure 8:
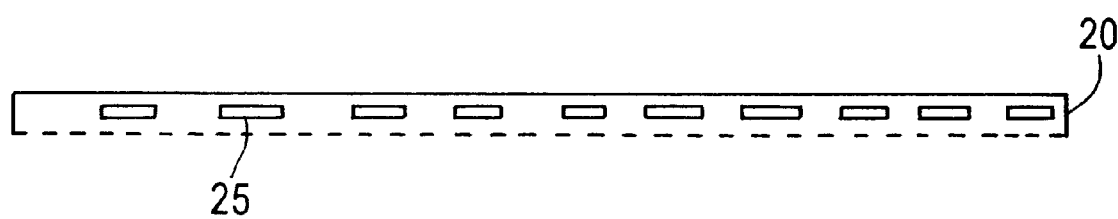
FIG. 8 is a cross sectional view of a rim showing minute channels at the edge of the rim.

60 Any air bubbles which are trapped between the first surface of the disc and the film which is attached first are squeezed out by stroking the film gently in a radially outward motion. Conveniently, the rim members may be provided with minute channels at their edges through which trapped air can be expelled FIG. 8 is a cross sectional view of a rim 20 showing one example of the minute channels 25 at the edge of the rim member.

When the attachment of the first assembly to the first side of the disc is complete, the second assembly is offered up to the second face of the disc and the above process of air bubble removal is repeated. The respective rim portions are releasably clipped together to form a unitary retaining mechanism for the upper and lower films.

Figure 6:
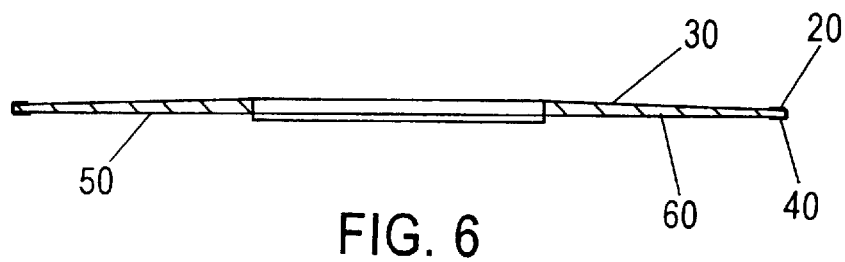
FIG. 6 is a side view in cross-section of the components shown in FIG. 5 after assembly.

The fully assembled arrangement is shown in cross-section in FIG. 6. Compact disc 60 is securely sandwiched between upper and lower film members 30 and 50 by the intermediary of fluid optical couplant such as the silicone preparations described previously.

Figure 9:
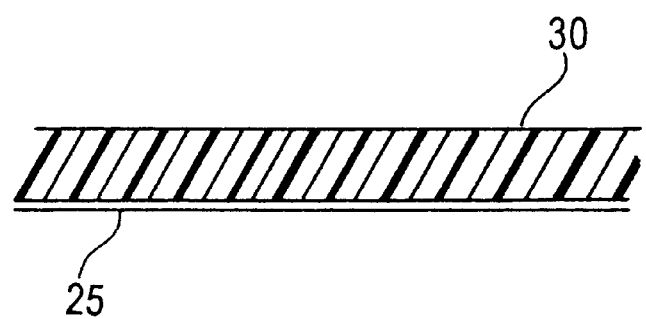
FIG. 9 is an illustration of a blow-up cross section of a portion of one of the film members with an optical couplant.

FIG. 9 shows an illustration of a blow-up cross section of a portion of film member 30 with optical couplant 25 applied to the surface of film 30 which is to be applied to the read surface of compact disc 60. As described earlier, since optical discs are often formed with a plastics substrate such as polycarbonate or acrylic resins, it is particularly advantageous that film member 30 formed from the same material, e.g., polycarbonate or acrylic resins.

Figure 7:
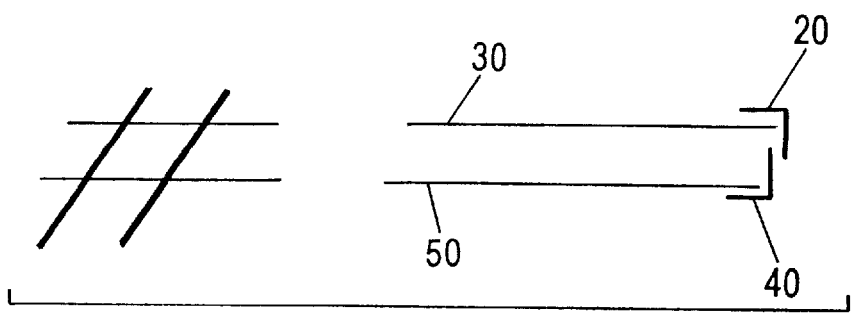
FIG. 7 is a close-up view of a portion of the arrangement depicted in FIG. 6, showing detail of the co-operating rims.

FIG. 7 is a close-up view of the interengaging rim members. In this view, the rim members are clearly shown as separate entities from their associated film members. However, as mentioned above, the rim members may be integrally formed with the film members or may be permanently bonded thereto such as by welding. It is also possible to have one film with an integrally-formed rim component and one film with a permanently-bonded rim component, or combinations of the above with a separate rim and film sub-assembly.

Figure 7A:
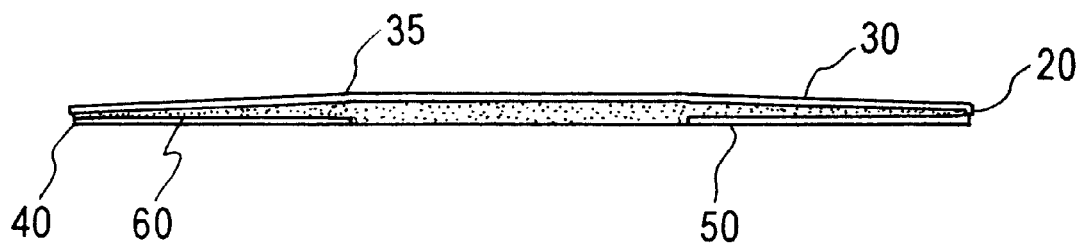
FIG. 7A is a view illustrating upper and lower films attached to a compact disc.

FIG. 7A illustrates lower film member 30 and upper film member 50 attached to compact disc 60 with optical couplant 35 sandwiched between the respective film member and the corresponding read and non-read side of the disc. Upper rim 20 and lower rim 40 are shown as being an integral part of the respective film member.

The purpose of the protective cover on the laser read surface of the disc is to minimize or prevent scratch damage. Damage to this surface causes laser light to be dispersed by reflection from the scratch which results in the data carried in that light being lost. The disc then skips. If the scratch is circular, it is more likely to impair the reading of the disc because the laser reads in a circular motion. Scratches across the disc are less of a problem because the laser can re-scan the disc to find the lost data, provided always that the scratch is not too wide. Scratch damage near the center of the disc may very well result in the entire disc being unplayable since the laser begins its scan here and must be able to identify the start of the recorded data. This is analogous to the start groove at the outer periphery of a gramophone disc tracked by a stylus.

Similar considerations apply in relation to the film applied to the non-read surface of a disc. Here, the purpose of the protective film is to prevent or minimize damage to the non-read surface to the extent that corruption of the reflective metallized layer is avoided. Minor blemishes on the non-read surface are not such a problem, but the enclosure of the present invention imparts an extra degree of protection which contributes; to the longevity of optical discs.

If the film is scratched, the damaged enclosure can be removed and replaced with a new unit having undamaged surfaces. In some embodiments, replacement of the defective part of the enclosure is all that is required and undamaged components can be re-used.

Where an optical couplant with favorable creep properties forms part of the enclosure, application of such an enclosure to a disc moderately damaged on its laser read surface is often sufficiently effective to cure the scratch damage and thereby restore the disc.

One of the main purposes of the rim means is to hold the enclosure in place on a disc. It also acts, by virtue of its mass, as an inertia device which helps the disc to spin more evenly in the playback apparatus. To be effective in this role, the rim means should have a minimum mass of 1 gram. Discs tend to wobble slightly in playback apparatus, which means that a small proportion of laser light is lost by reflection at non-ideal angles. Normally, a small decrease in light intensity is not a problem, but it can be critical if the disc is soiled by dust or fingerprints, for example. If wobbling coincides with a dirty region of the disc, the laser intensity may drop to a level which causes skipping to occur. Hence, elimination of wobbling makes the playback apparatus more tolerant of surface imperfections on the disc.

As mentioned previously, another function of the rim means is to protect the disc edge from damage by chipping. However, the rim means is also helpful in preventing surface damage to the disc because it raises the bottom surface of the disc slightly from any surface on which it might be placed when not in its storage case or in use.

Although the invention has been particularly described with reference to one preferred embodiment, it will be understood by persons skilled in the art that various modifications are possible without departing from the scope of the claims which follow. For example, the invention may be adapted to optical data storage devices having two readable faces by using optically perfect films on both sides, said films being provided with a solid malleable optical couplant on the faces thereof which contact the surface of the optical data storage device.

What is claimed is:

1. An enclosure for an optical storage device having a read surface of a prescribed refractive index, a non-read surface and a peripheral edge surface, comprising:
   a first planar film having a planar surface dimensioned to overlie the read surface of the optical data storage device; and
   a second planar film having a planar surface dimensioned to overlie the non-read surface of the optical data storage device;
   each of the first and second planar films having a rim extending parallel and axially from its planar surface to overlie at least a portion of the peripheral edge surface of the optical storage device when the films are applied to cover the read and non-read surface of said optical storage device, respectively.

2. The enclosure of claim 1, wherein the rims of each of the first and second planar films together have a mass sufficient to afford an inertial effect for correcting imbalances of the optical data storage device enclosed by said enclosure.

3. The enclosure of claim 2, wherein the rims of the first and second planar films together have a minimum mass of 1 gram.

4. The enclosure of claim 1, wherein said rim of the first planar film includes minute openings to allow air trapped between the first planar film and the read surface of the optical data storage device to be expelled.

5. An enclosure for an optical storage device having a read surface of a prescribed refractive index, a non-read surface and a peripheral edge surface, comprising:

a first planar transparent film having a planar surface dimensioned to overlie the read surface of the optical data storage device;

a second planar transparent film having a planar surface dimensioned to overlie the non-read surface of the optical data storage device; and first and second rims;

the first rim having a first leg on the planar surface of the first film and a second leg positioned to overlie at least a portion of the peripheral edge surface of the optical storage device; and the second rim having a first leg on the planar surface of the second film and a second leg positioned to overlie at least a portion of the peripheral edge surface of the optical storage device.

6. The enclosure in accordance with claim 5, in which the first and second rims are integral with the first and second films, respectively.

7. The enclosure of claim 6, wherein the first and second rims together have a mass sufficient to afford an inertial effect for correcting imbalances of the optical data storage device enclosed by said enclosure.

8. The enclosure of claim 7, wherein the first and second rims together have a minimum mass of 1 gram.

9. The enclosure of claim 5, wherein said first rim includes minute openings to allow air trapped between the first planar film and the read surface of the optical data storage device to be expelled.

* * * * *